US012736102B2

(12) United States Patent
Garcia et al.

(10) Patent No.: US 12,736,102 B2
(45) Date of Patent: Sep. 15, 2026

(54) VALVE SEAT FOR DAMPER WITH EXTERNALLY MOUNTED VALVE

(71) Applicant: Advanced Suspension Technology LLC, Northville, MI (US)

(72) Inventors: Antonio Calo Garcia, Bilbao (ES); Simon Sanchez, Ermua (ES)

(73) Assignee: Advanced Suspension Technology LLC, Northville, MI (US)

( * ) Notice: Subject to any disclaimer, the term of this patent is extended or adjusted under 35 U.S.C. 154(b) by 491 days.

(21) Appl. No.: 18/543,448

(22) Filed: Dec. 18, 2023

(65) Prior Publication Data

US 2025/0198479 A1 Jun. 19, 2025

(51) Int. Cl.

| | |
|---|---|
| ***F16F 9/34*** | (2006.01) |
| ***F16F 9/36*** | (2006.01) |
| ***F16F 9/43*** | (2006.01) |
| ***F16K 1/42*** | (2006.01) |
| ***F16K 1/46*** | (2006.01) |

(52) U.S. Cl.
CPC ............ *F16F 9/3405* (2013.01); *F16F 9/369* (2013.01); *F16F 9/437* (2013.01); *F16K 1/42* (2013.01); *F16K 1/465* (2013.01)

(58) Field of Classification Search
CPC .......... F16F 9/3405; F16F 9/369; F16F 9/437; F16K 1/42; F16K 1/465
See application file for complete search history.

(56) References Cited

U.S. PATENT DOCUMENTS

| | | | | |
|---|---|---|---|---|
| 5,603,392 | A * | 2/1997 | Beck | F16F 9/325 188/266.6 |
| 5,740,890 | A * | 4/1998 | Forster | F16F 9/325 188/322.13 |
| 9,644,760 | B2 * | 5/2017 | Mori | F16F 9/465 |
| 2016/0025237 | A1 * | 1/2016 | Mori | F16K 31/0655 251/30.01 |

FOREIGN PATENT DOCUMENTS

| | | | | |
|---|---|---|---|---|
| DE | 3712477 | A * | 10/1987 | |
| DE | 4031760 | A1 * | 4/1992 | B60G 17/08 |
| DE | 4137821 | A1 * | 5/1993 | F16F 9/516 |
| DE | 4237666 | C2 * | 7/1996 | F16F 9/325 |
| DE | 10355151 | B4 | 4/2009 | |
| DE | 102014211699 | A1 | 12/2015 | |
| WO | WO-2025062656 | A1 * | 3/2025 | F16F 9/34 |

* cited by examiner

*Primary Examiner* — Vishal R Sahni
(74) *Attorney, Agent, or Firm* — Harness, Dickey & Pierce, P.L.C.

(57) ABSTRACT

A damper including a pressure tube, a reserve tube, an intermediate tube positioned between the pressure and reserve tubes, and one or more external control valves. A piston divides the pressure tube into first and second working chambers. A control valve seat provides a connection interface for the external control valve(s). The control valve seat includes a neck portion and a flange portion with a pair of cut-outs that are circumferentially spaced from one another to define first and second windows that are arranged in fluid communication with a reserve tube opening and first and second wings that extend out from the neck portion and sit/rest against the reserve tube.

20 Claims, 8 Drawing Sheets

20
22
24
26
28
30
30
32
32
32
32
34
34
36
36
38
38
40

32
162
164
168
159
166
158
160
156
90
94
96
64
100
72
95
98
70
106
146
136
154
46
88
92
54
84
48
62
58
56
50
102
60
64
150
66
132
71
69
42
52
134
148
44
104
152
76
68
78
80
82
86

VALVE SEAT FOR DAMPER WITH EXTERNALLY MOUNTED VALVE

FIELD

The present disclosure generally relates to dampers. More particularly, the present disclosure relates to dampers with one or more externally mounted control valves.

BACKGROUND

This section provides background information related to the present disclosure which is not necessarily prior art.

Vehicles generally include dampers that are used in conjunction with suspension systems to absorb vibrations and bumps during driving. In order to absorb vibration and bumps, dampers are generally connected between a body and the suspension system of the vehicle. A piston is located within a pressure tube of the damper and separates the pressure tube into a first working chamber and a second working chamber. The piston is connected to the vehicle body or the suspension of the vehicle through a piston rod. Dampers typically include one or more valves that control fluid flow between the first and second working chambers during extension and compression motions of the piston and piston rod. In current damper designs, fluid flow during compression strokes is limited by the piston rod volume entering the damper. As a result, the range of damping forces the damper can provide is more limited during compression strokes compared to extension (e.g., rebound) strokes because the volume of fluid inside the damper that is displaced by the piston increases during compression strokes and decreases during rebound strokes. The use of multiple annular chambers (e.g., a reservoir chamber and an intermediate chamber) surrounding the pressure tube in combination with one or more external control valves helps address this problem and provides the benefit of enabling adaptive control/adjustment of rebound and compression damping in real time. According to such designs, the damper can be tuned within a larger compression damping force range to suit a wide spectrum of vehicles compared to other damper designs. However, existing mounting solutions for the external control valve(s) have been shown to place excessive stress on the tubes forming the damper, resulting in tube deformation, which leads to undesirable variances in manufacturing tolerances.

SUMMARY

This section provides a general summary of the disclosure, and is not a comprehensive disclosure of its full scope or all of its features.

In accordance with one aspect of the present disclosure, a damper is provided. The damper includes a pressure tube and a piston that is slidably disposed within the pressure tube. The piston divides the pressure tube into a first working chamber and a second working chamber. The damper also includes a reserve tube disposed annularly around the pressure tube and an intermediate tube that is disposed annularly about the pressure tube and is positioned radially between the pressure tube and the reserve tube. A reservoir chamber is disposed radially between the intermediate tube and the reserve tube. Additionally, an intermediate chamber is disposed radially between the intermediate tube and the pressure tube.

The damper includes an external control valve mounted on the reserve tube. The external control valve includes a control valve inlet and a control valve outlet. The control valve inlet is positioned in fluid communication with the intermediate chamber and the control valve outlet is positioned in fluid communication with the reservoir chamber.

The damper further includes a reserve tube opening that extends through the reserve tube, an intermediate tube opening that extends through the intermediate tube, and a control valve seat. The control valve seat includes a valve seat body with a neck portion that is at least partially received within the reserve tube opening and a flange portion that extends out from the neck portion of the valve seat body. A control valve inlet passage extends through the valve seat body from the intermediate tube opening to the control valve inlet. The flange portion of the control valve seat includes a pair of cut-outs that are circumferentially spaced from one another to define first and second windows that are open to and arranged in fluid communication with the reservoir chamber and first and second wings that extend out from the neck portion and sit/rest against the reserve tube.

In accordance with another aspect of the present disclosure, the flange portion of the control valve seat includes an outer surface with a land that is arranged in abutment with the external control valve and a curved inner surface that sits flush against an outside surface of the reserve tube. Again, the flange portion of the control valve seat includes a pair of cut-outs that are circumferentially spaced from one another to define first and second windows and first and second wings. The first and second windows in the flange portion of the control valve seat are open to and arranged in fluid communication with the reserve tube opening. The first and second wings of the flange portion of the control valve seat extend circumferentially relative to the neck portion along a limited circumferential extent between the first and second windows, where the curved inner surface of the flange portion extends along the first and second wings.

In accordance with another aspect of the present disclosure, the damper may further include a base valve assembly including a base valve body defining an end chamber of the damper that is arranged in fluid communication with the second working chamber via at least one base valve. The reservoir chamber is arranged in fluid communication with the end chamber via one or more reservoir chamber passages. The reservoir chamber passages may be defined by slots in the base valve body and are positioned in fluid communication with and are disposed between the reservoir chamber and the end chamber.

Advantageously, the design of the control valve seat disclosed herein, with its windows and wings, provides a large load bearing area/surface along the curved inner surface of the flange portion that sits/rests against the reserve tube to reduce localized stress and deformation of the reserve tube in the area surrounding the reserve tube opening when the external control valve is installed on the damper.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
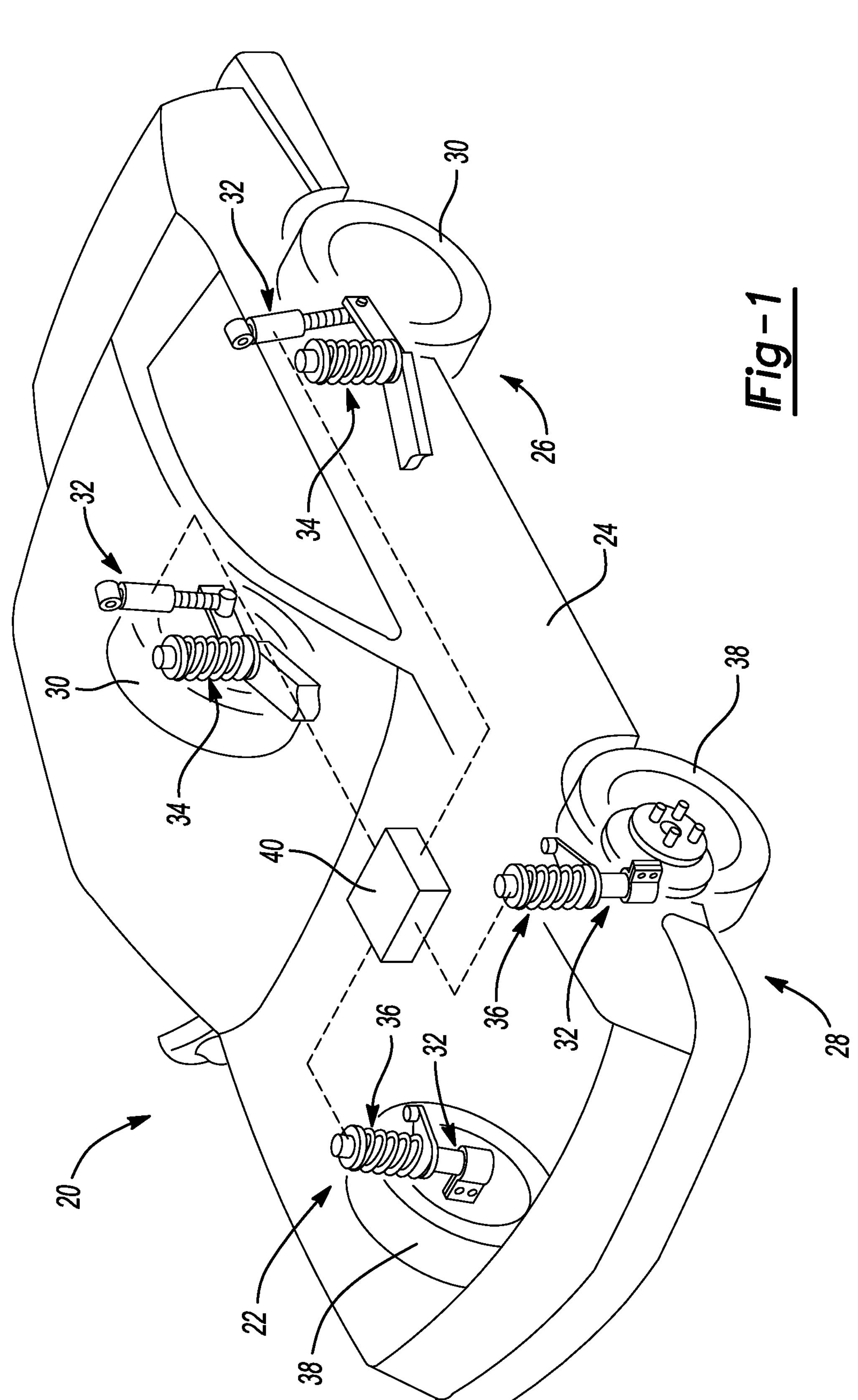
FIG. 1 is an illustration of a vehicle incorporating a suspension system constructed in accordance with the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an exemplary vehicle 20 incorporating a suspension system 22 in accordance with the present disclosure. The vehicle 20 may be driven by an internal combustion engine, an electric motor, a hybrid/electric powertrain, or equivalents thereof. The vehicle 20 includes a body 24. The suspension system 22 of the vehicle 20 includes a rear suspension 26 and a front suspension 28. The rear suspension 26 includes a rear axle assembly (not shown) adapted to operatively support a pair of rear wheels 30. The rear axle assembly is operatively connected to the body 24 by means of a pair of dampers 32 and a pair of helical coil springs 34. Similarly, the front suspension 28 includes a front axle assembly (not shown) that supports a pair of front wheels 38. The front axle assembly is connected to the body 24 by means of another pair of the dampers 32 and a pair of helical coil springs 36. In an alternative embodiment, the vehicle 20 may include an independent suspension unit (not shown) for each of the four corners instead of front and rear axle assemblies.

The dampers 32 of the suspension system 22 serve to dampen the relative movement of the unsprung portion (i.e., the front and rear suspensions 28, 26 and the front and rear wheels 38, 30) and the sprung portion (i.e., the body 24) of the vehicle 20. While the vehicle 20 has been depicted as a passenger car, the dampers 32 may be used with other types of vehicles. Examples of such vehicles include buses, trucks, off-road vehicles, three-wheelers, ATVs, motor bikes, and so forth. Furthermore, the term "damper" as used herein will refer to dampers in general and will include shock absorbers, McPherson struts, and semi-active and active suspensions.

In order to automatically adjust each of the dampers 32, an electronic controller 40 is electrically connected to the dampers 32. The electronic controller 40 is used for controlling the operation of each of the dampers 32 in order to provide appropriate damping characteristics resulting from movements of the body 24 of the vehicle 20. The electronic controller 40 may independently control each of the dampers

32 in order to independently control a damping level of each of the dampers 32. The electronic controller 40 may be electrically connected to the dampers 32 via wired connections, wireless connections, or a combination thereof.

The electronic controller 40 may independently adjust the damping level, damping rate, or damping characteristics of each of the dampers 32 to optimize the ride performance of the vehicle 20. The term "damping level", as used herein, refers to a damping force produced by each of the dampers 32 to counteract compression and/or extension/rebound movements. A higher damping level may correspond to a higher damping force. Similarly, a lower damping level may correspond to a lower damping force. Adjustment of the damping levels is beneficial during braking and turning of the vehicle 20 to counteract brake dive during braking and body roll during turns. In accordance with one embodiment of the present disclosure, the electronic controller 40 processes input signals from one or more sensors (not shown) of the vehicle 20 in order to control the damping level of each of the dampers 32. The sensors may sense one or more parameters of the vehicle 20, such as, but not limited to, displacement, velocity, acceleration, vehicle speed, steering wheel angle, brake pressure, engine torque, engine speed in revolutions per minute (RPM), throttle pedal position, and so forth. The electronic controller 40 may further control the damping level of the dampers 32 based on a driving mode of the vehicle 20. The driving mode may include a sport mode and a comfort mode. A button (not shown) may allow a driver of the vehicle 20 to choose the driving mode of the vehicle 20. The electronic controller 40 may receive input signals based on an actuation of the button and control the dampers 32 accordingly.

In accordance with another embodiment of the present disclosure, the electronic controller 40 controls the damping level of each of the dampers 32 based on external road conditions, such as rain, snow, mud, and the like. In a further embodiment, the electronic controller 40 regulates the damping level of each of the dampers 32 based on internal vehicle conditions, such as a fuel level, occupancy of the vehicle, load, and so forth.

While the present disclosure is being illustrated with a single electronic controller 40, it is within the scope of the present disclosure to utilize a dedicated electronic controller for each of the dampers 32. The dedicated electronic controller may be located onboard each respective damper 32. Alternatively, the electronic controller 40 may be integrated into an Electronic Control Unit (ECU) of the vehicle 20. The electronic controller 40 may include a processor, memory, Input/Output (I/O) interfaces, communication interfaces, and other electrical components. The processor may execute various instructions stored in the memory for carrying out various operations of the electronic controller 40. The electronic controller 40 may receive and transmit signals and data through the I/O interfaces and the communication interfaces. In further embodiments, the electronic controller 40 may include microcontrollers, application-specific integrated circuits (ASICs), field programmable gate arrays (FPGAs), and so forth.

Figure 2:
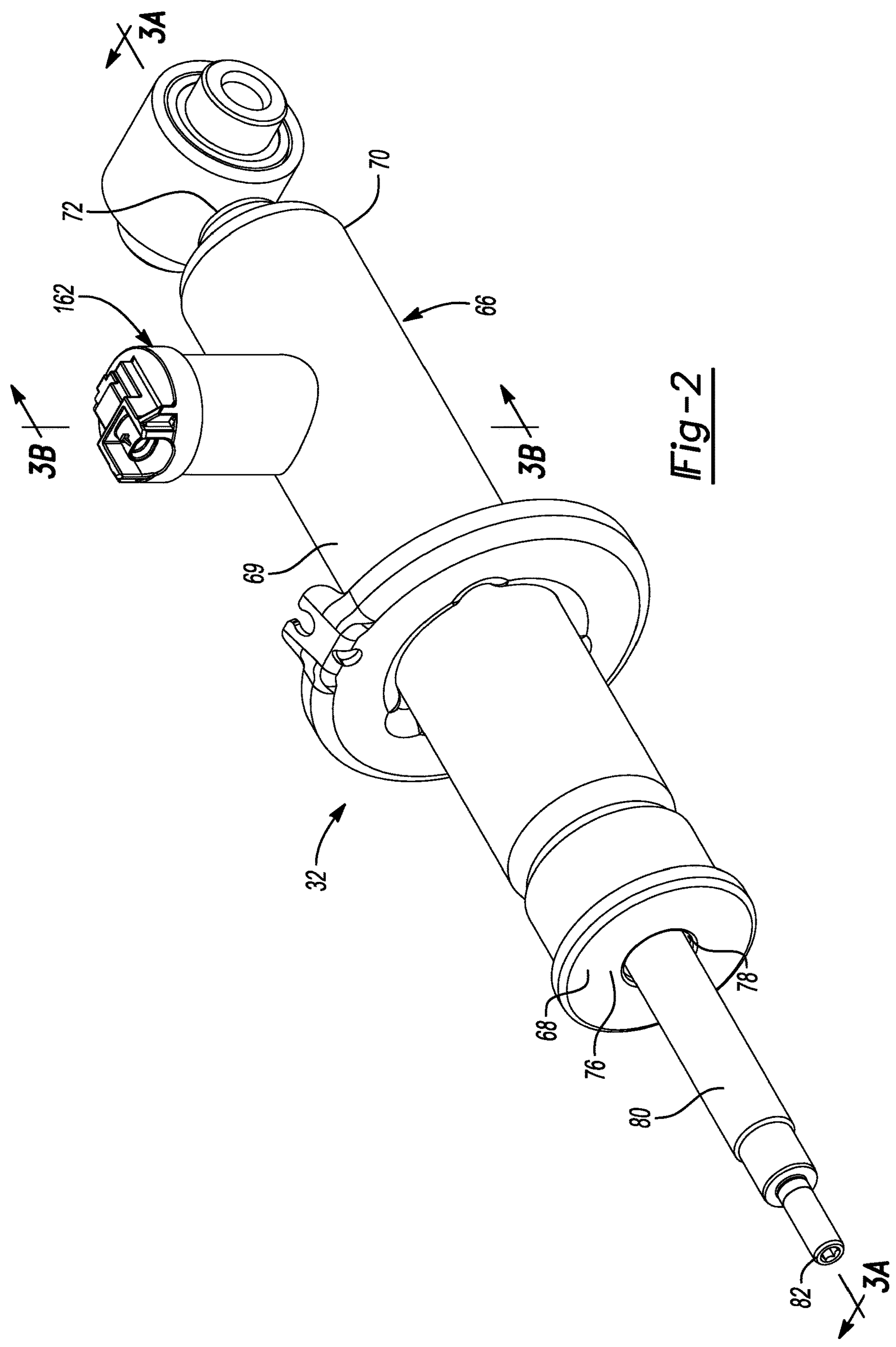
FIG. 2 is a front perspective view of an exemplary damper constructed in accordance with the present disclosure.
Figure 3A:
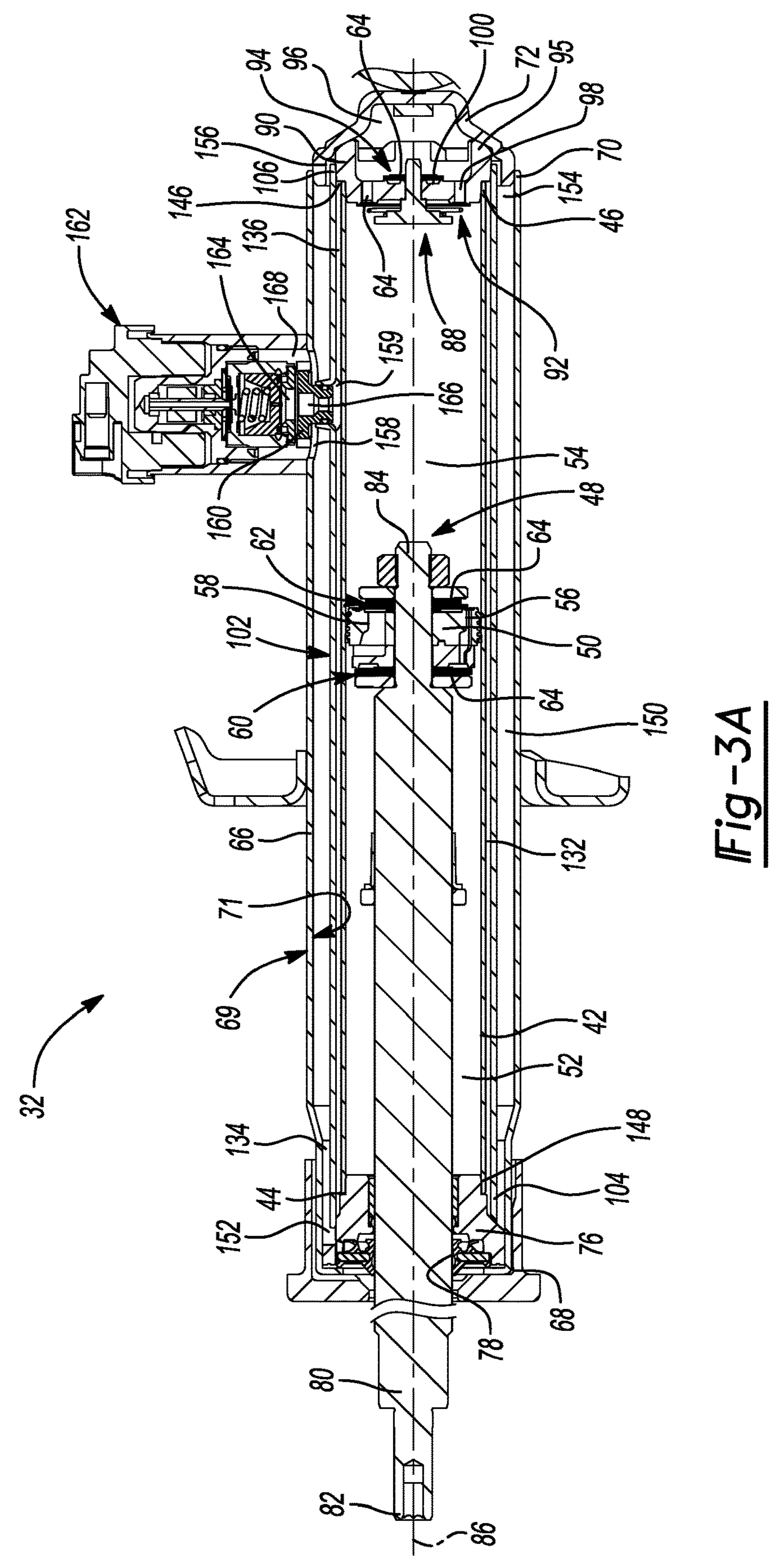
FIG. 3A is a side cross-sectional view of the damper taken along line 3A-3A in FIG. 2.
Figure 3B:
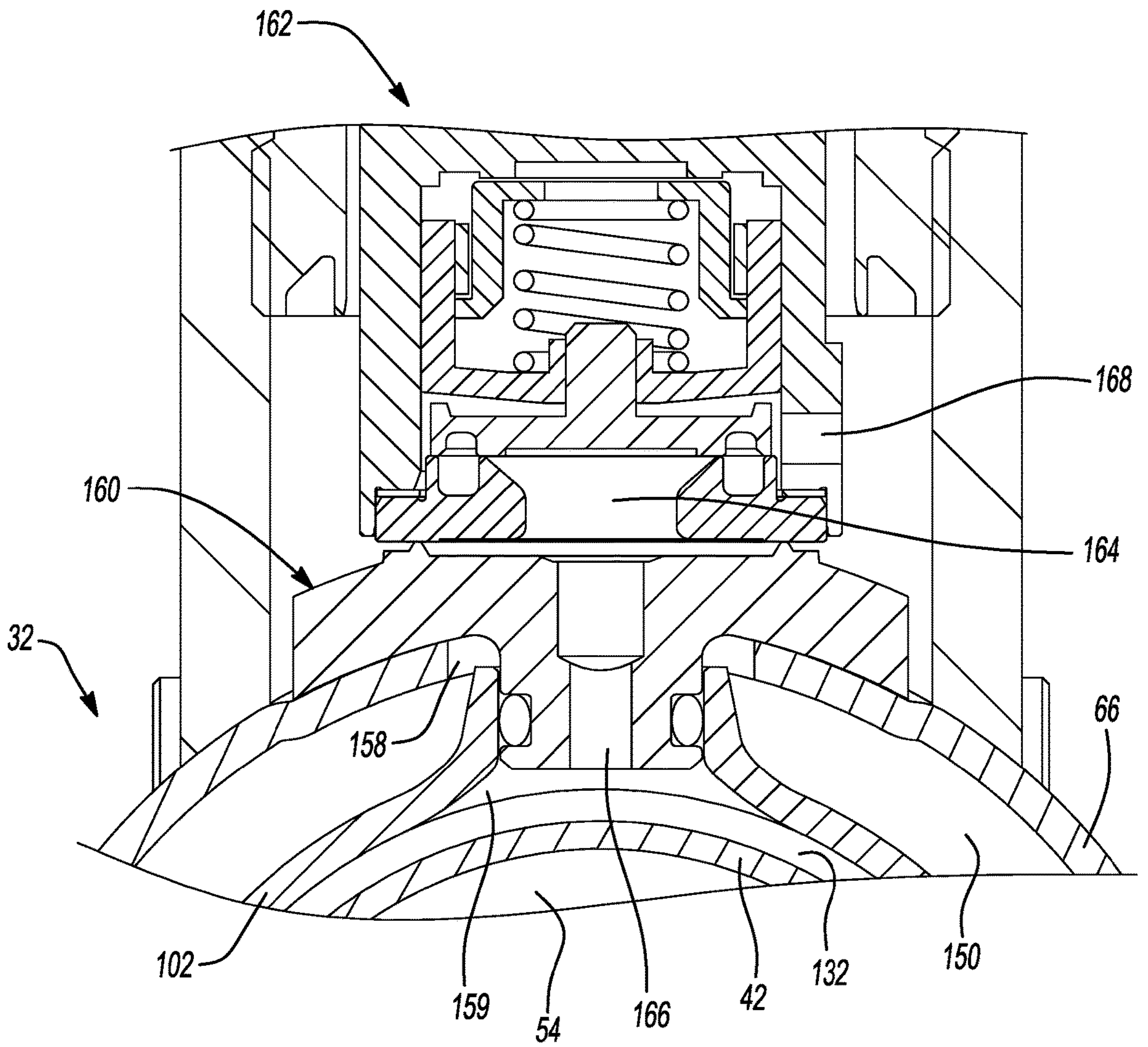
FIG. 3B is a front cross-sectional view of the damper taken along line 3B-3B in FIG. 2.
Figure 4:
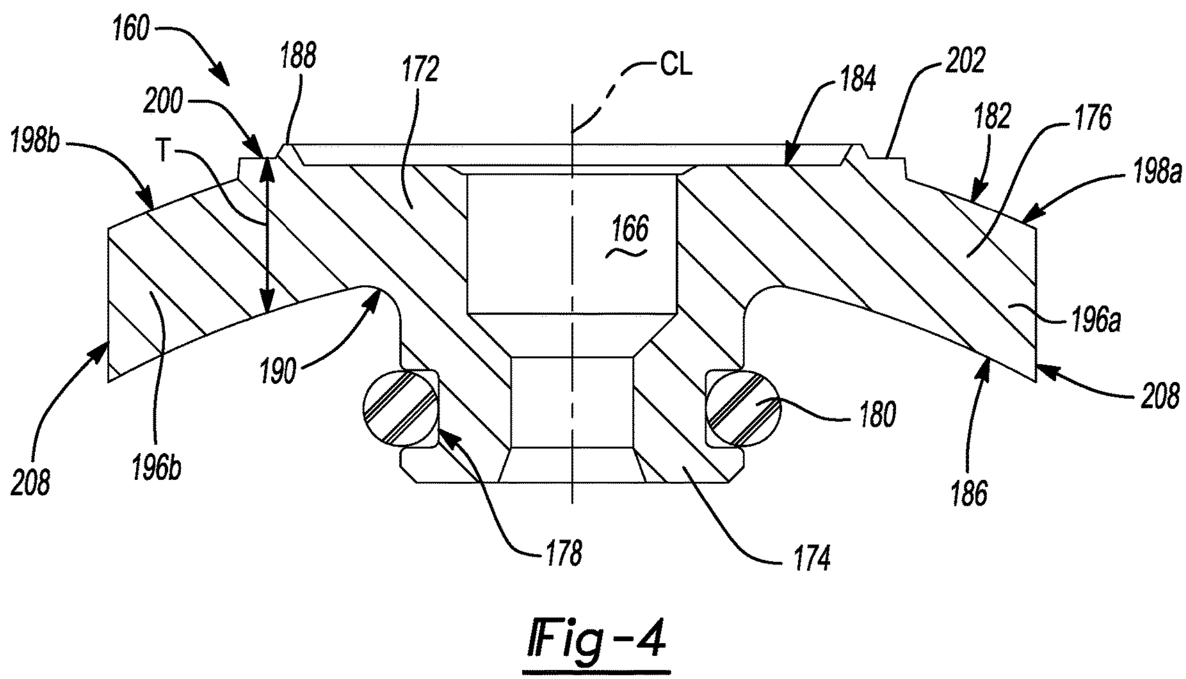
FIG. 4 is a front cross-sectional view of an exemplary valve seat of the damper shown in FIGS. 3A and 3B.
Figure 5:
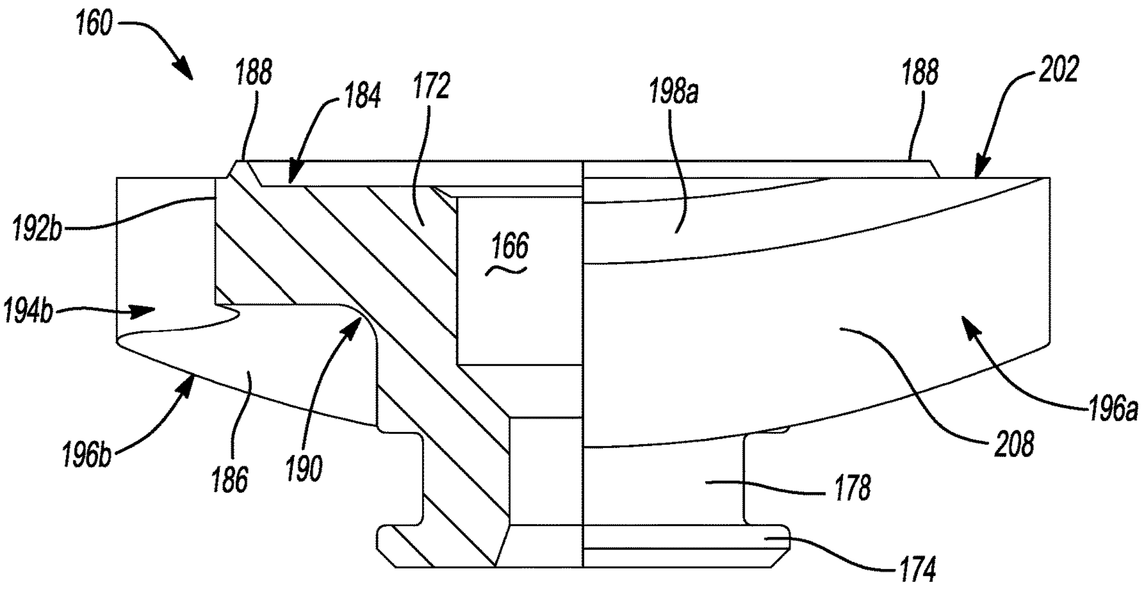
FIG. 5 is a partial, side sectional view of the exemplary valve seat of the damper shown in FIGS. 3A and 3B.

FIG. 2 and FIGS. 3A and 3B illustrate an exemplary damper 32, which may be any of the four dampers 32 of the vehicle 20 shown in FIG. 1. The damper 32 may optionally be configured as a continuously variable semi-active suspension system damper 32. The damper 32 contains fluid. By way of example and without limitation, the fluid is hydraulic fluid or oil. The damper 32 includes a pressure tube 42 that extends longitudinally between a first pressure tube end 44 and a second pressure tube end 46. A piston assembly 48 includes a piston 50 slidably disposed within the pressure tube 42. The piston 50 defines a first working chamber 52 and a second working chamber 54 within the pressure tube 42. The first working chamber 52 is positioned longitudinally between the piston 50 and the first pressure tube end 44 and acts as a rebound chamber during movement of the piston 50. The second working chamber 54 is positioned longitudinally between the piston 50 and the second pressure tube end 46 and acts as a compression chamber. The piston 50 includes first and second piston passages 56, 58 that extend longitudinally through the piston 50 between the first and second working chambers 52, 54.

The piston assembly 48 further includes a first piston valve 60 and a second piston valve 62. The first piston valve 60 is mounted on the piston 50 and configured to limit fluid flow through the first piston passage 56 from the second working chamber 54 to the first working chamber 52. The second piston valve 62 is mounted on the piston 50 and configured to limit fluid flow through the second piston passage 58 from the first working chamber 52 to the second working chamber 54. Each of the first piston valve 60 and second piston valve 62 includes at least one flex disc 64. For the first piston valve 60, the flex disc 64 is configured to flex toward the piston 50 and close the first piston passage 56 when a first pressure differential between the first and second working chambers 52, 54 is below a first pressure threshold. The flex disc 64 is configured to flex away from the piston 50 and open the first piston passage 56 when the first pressure differential between the first and second working chambers 52, 54 exceeds the first pressure threshold, thereby allowing fluid in the second working chamber 54 to flow through the first piston passage 56 and into the first working chamber 52. For the second piston valve 62, the flex disc 64 is configured to flex toward the piston 50 and close the second piston passage 58 when a second pressure differential between the first and second working chambers 52, 54 is below a second pressure threshold. The flex disc 64 is configured to flex away from the piston 50 and open the second piston passage 58 when the second pressure differential between the first and second working chambers 52, 54 exceeds the second pressure threshold, thereby allowing fluid in the first working chamber 52 to flow through the second piston passage 58 and into the second working chamber 54.

The damper 32 also includes a reserve tube 66 that is disposed annularly around the pressure tube 42 and extends longitudinally between a first reserve tube end 68 and a second reserve tube end 70. The reserve tube 66 includes an outside surface 69 and an inside surface 71 and a closed end cap 72 is positioned in and closes off the second reserve tube end 70. A piston rod guide 76 is housed inside the first reserve tube end 68. The piston rod guide 76 includes a piston rod passage 78 that extends longitudinally between the first reserve tube end 68 and the first working chamber 52 of the pressure tube 42. A piston rod 80 extends longitudinally between a first piston rod end 82 and a second piston rod end 84 along a longitudinal axis 86, through the piston rod passage 78 of the piston rod guide 76. The second piston rod end 84 is attached to the piston 50 and the first piston rod end 82 is configured to attach to a suspension component of the vehicle.

The damper 32 further includes a base valve assembly 88. The base valve assembly 88 includes a base valve body 90, a first base valve 92, and a second base valve 94. The base valve body 90 has projections 95 that abut the closed end cap 72 of the second reserve tube end 70 and defines an end chamber 96 positioned between the closed end cap 72 and the base valve body 90. The base valve body 90 includes a first and second base valve passage 98, 100 that extends longitudinally through the base valve body 90 between the second working chamber 54 and the end chamber 96. The first base valve 92 includes at least one flex disc 64 that is configured to flex toward the base valve body 90 and close the first base valve passage 98 when a third pressure differential between the second working chamber 54 and the end chamber 96 is below a third pressure threshold. The flex disc 64 of the first base valve 92 is configured to flex away from the base valve body 90 and open the first base valve passage 98 when the third pressure differential between the second working chamber and the end chamber 96 exceeds the third pressure threshold, thereby allowing fluid in the end chamber 96 to flow through the first base valve passage 98 and into the second working chamber 54. The second base valve 94 also includes at least one flex disc 64 that is configured to flex toward the base valve body 90 and close the second base valve passage 100 when a fourth pressure differential between the second working chamber 54 and the end chamber 96 is below a fourth pressure threshold. The flex disc 64 of the second base valve 94 is configured to flex away from the base valve body 90 and open the second base valve passage 100 when the fourth pressure differential between the second working chamber 54 and the end chamber 96 exceeds the fourth pressure threshold, thereby allowing fluid in the second working chamber 54 to flow through the second base valve passage 100 and into the end chamber 96.

Further, the damper 32 includes an intermediate tube 102 disposed annularly about the pressure tube 42 and positioned radially between the pressure tube 42 and the reserve tube 66. The intermediate tube 102 extends longitudinally between a first intermediate tube end 104 and a second intermediate tube end 106.

The damper 32 includes an intermediate chamber 132 disposed radially between the intermediate tube 102 and the pressure tube 42. The intermediate chamber 132 extends longitudinally between a first intermediate chamber end 134 and a second intermediate chamber end 136. The first intermediate tube end 104 abuts the piston rod guide 76 and the second intermediate tube end 106 abuts the base valve assembly 88. One or more intermediate chamber openings 146 in the second intermediate tube end 106 and/or the base valve body 90 allow for fluid communication between the second working chamber 54 and the intermediate chamber 132. Additionally, the intermediate chamber 132 is arranged in fluid communication with the first working chamber 52 via one or more pressure tube openings 148 in the first pressure tube end 44 and/or the piston rod guide 76, which extend between the first working chamber 52 and the intermediate chamber 132.

The damper 32 further includes a reservoir chamber 150, disposed radially between the intermediate tube 102 and the reserve tube 66, extending longitudinally between a first reservoir chamber end 152 and a second reservoir chamber end 154. The first reservoir chamber end 152 is positioned adjacent to the piston rod guide 76 and the second reservoir chamber end 154 is positioned adjacent to the closed end cap 72. The reservoir chamber 150 is filled with fluid and gas where gas rises toward the first reservoir chamber end 152 and fluid fills the reservoir chamber 150 from the second reservoir chamber end 154 toward the first reservoir chamber end 152. At least one reservoir chamber passage 156 is positioned between the projections 95 on the base valve body 90 that provides fluid communication between the reservoir chamber 150 and the end chamber 96.

The damper 32 includes a reserve tube opening 158, positioned between the first reserve tube end 68 and the second reserve tube end 70, that extends through the reserve tube 66. Although other configurations are possible, in the illustrated example, the reserve tube opening 158 is an elongated hole (i.e., a hole that is elongated in the longitudinal direction such that the hole has an oval shape). The damper 32 also includes an intermediate tube opening 159, positioned between the first intermediate tube end 104 and the second intermediate tube end 106, that extends through the intermediate tube 102. A control valve seat 160 is positioned within the reserve tube opening 158 and the intermediate tube opening 159. An external control valve 162 abuts the control valve seat 160 and is externally mounted to the reserve tube 66. The external control valve 162 includes a control valve inlet 164 that is arranged in fluid communication with the intermediate chamber 132 via a control valve inlet passage 166 that extends through the control valve seat 160. The external control valve 162 further includes a control valve outlet 168 positioned in fluid communication with the reservoir chamber 150 via the reserve tube opening 158.

The external control valve 162 is a two-position, solenoid actuated electro-mechanical valve. The electronic controller 40 may regulate the external control valve 162 in order to control the damping level of the damper 32. The external control valve 162 may be controlled by an input current provided to the solenoid of the external control valve 162. The electronic controller 40 generates the input current in order to control the operation and the damping level of the damper 32. The solenoid of the external control valve 162 may be connected in electrical communication with the electronic controller 40. Further, the input current may vary between lower and upper limits, which correspond to least and most restrictive positions (i.e., an open position and a closed position) of the external control valve 162. The electronic controller 40 may control the damping force or level by controlling a degree of restriction of the external control valve 162. Specifically, the electronic controller 40 may regulate the input currents to vary a restriction of the external control valve 162. Sending a low current to the external control valve 162 may correspond to a low damping ratio or damping level. Similarly, sending a high current to the external control valve 162 may correspond to a high damping ratio or damping level.

With additional reference to FIGS. 4-7, the control valve seat 160 is illustrated in more detail. The control valve seat 160 has a valve seat body 172 with a neck portion 174 and a flange portion 176. The neck portion 174 of the control valve seat 160 is received in and extends into or through the reserve tube opening 158 and the intermediate tube opening 159. The flange portion 176 of the control valve seat 160 extends radially out from the neck portion 174 of the valve seat body 172. The control valve inlet passage 166 extends longitudinally through both the neck portion 174 and the flange portion 176 of the valve seat body 172 along a centerline CL of the control valve seat 160. The control valve inlet passage 166 extends between the intermediate chamber 132 and the control valve inlet 164 and therefore communicates hydraulic fluid from the intermediate chamber 132 to the control valve inlet 164. As shown in the illustrated example, the control valve inlet passage 166 may have stepped and/or tapered bore segments.

As shown in the illustrated example, the intermediate tube opening 159 may have a cylindrical portion that protrudes into the reservoir chamber 150 and the neck portion 174 of the valve seat body 172 may include an annular groove 178 that receives an O-ring seal 180. As shown in FIGS. 3A and 3B, the O-ring seal 180 abuts the cylindrical portion of the intermediate tube opening 159 when the neck portion 174 of the valve seat body 172 is pressed/installed into the intermediate tube opening 159.

The flange portion 176 of the control valve seat 160 includes an outer surface 182 with a land 184 that is arranged in abutment with the external control valve 162 and a curved inner surface 186 that sits flush against the outside surface 69 of the reserve tube 66. In particular, the land 184 includes an annular rib 188 that abuts the external control valve 162 and extends annularly about the control valve inlet 164 when the external control valve 162 is installed and pressed against the control valve seat 160. The control valve seat 160 shown in the illustrated example also includes a fillet 190 where the curved inner surface 186 of the flange portion 176 meets the neck portion 174 of the valve seat body 172. The curvature/radius of the fillet 190 is selected to reduce stress concentration in this area.

Figures 6, 7:
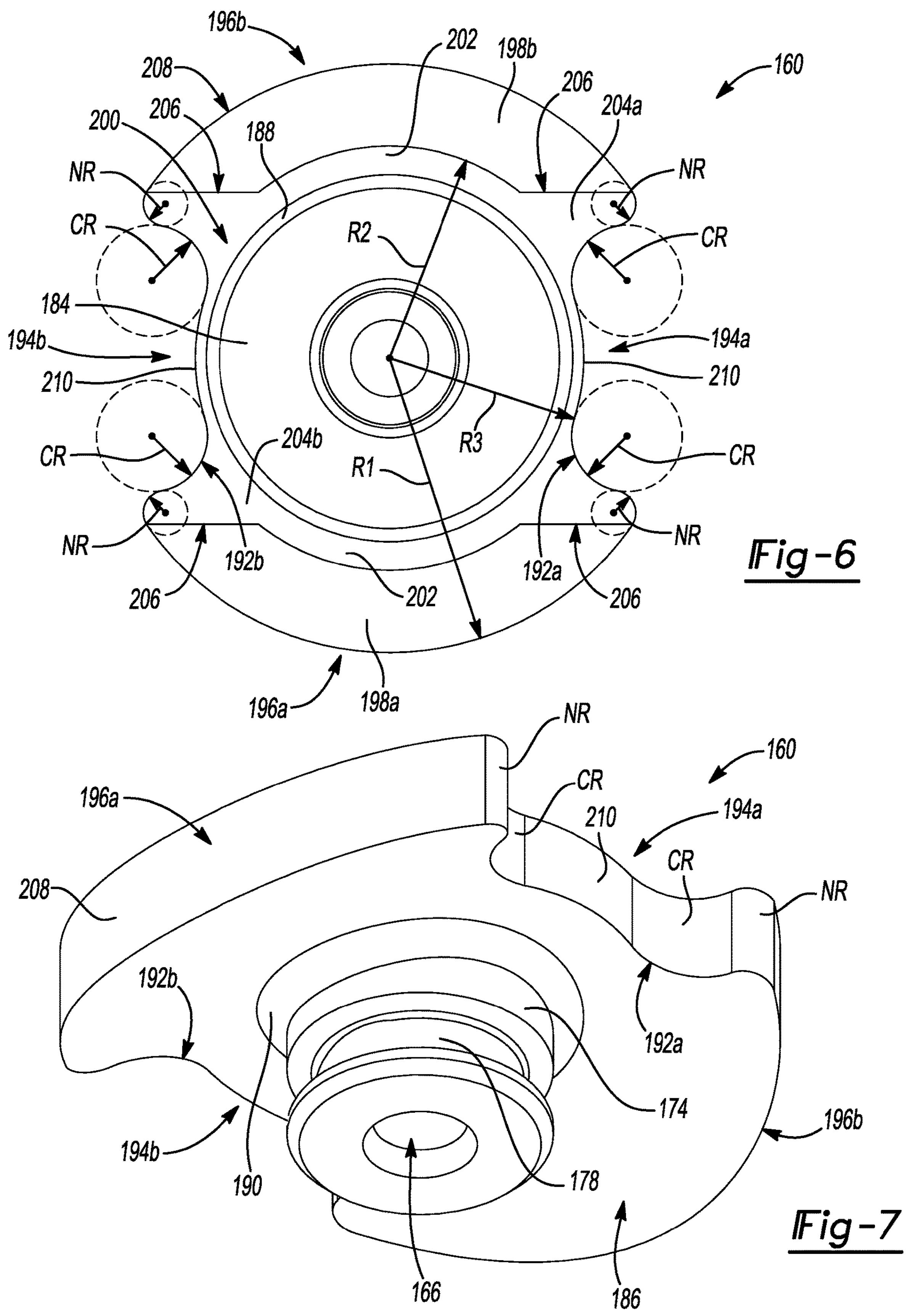
FIG. 6 is a top elevation view of the exemplary valve seat of the damper shown in FIGS. 3A and 3B.
FIG. 7 is a bottom perspective view of the exemplary valve seat of the damper shown in FIGS. 3A and 3B.

The flange portion 176 of the control valve seat 160 includes a pair of cut-outs 192*a*, 192*b* that are circumferentially spaced from one another to define first and second windows 194*a*, 194*b* and first and second wings 196*a*, 196*b* in the flange portion 176 of the control valve seat 160. The first and second windows 194*a*, 194*b* in the flange portion 176 of the control valve seat 160 are open to and arranged in fluid communication with the reservoir chamber 150 via the reserve tube opening 158. The first and second wings 196*a*, 196*b* extend circumferentially relative to the neck portion 142 of the valve seat body 172 along a limited circumferential extent between the first and second windows 194*a*, 194*b*. By way of example and without limitation, when the control valve seat 160 is viewed from above, as shown in FIG. 6, the cut-outs 192*a*, 192*b* generally span the 2 o'clock to 4 o'clock and the 8 o'clock to 10 o'clock positions, respectively, the first wing 196*a* generally spans the 4 o'clock to 8 o'clock position, and the second wing 196*b* generally spans the 10 o'clock to 2 o'clock position. Thus, it should be appreciated that curved inner surface 186 of the flange portion 176 of the control valve seat 160 has a load bearing surface area that is increased in size by the first and second wings 196*a*, 196*b*. This increase in the load bearing surface area of the curved inner surface 186 of the flange portion 176 of the control valve seat 160 helps reduce deformation of the reserve tube 66 when the external control valve 162 is installed and pressed against the control valve seat 160. For example and without limitation, the external control valve 162 may be installed on/attached to the reserve tube 66 via a press-fit or threaded connection that can place significant load on the reserve tube 66 in the area surrounding the reserve tube opening 158.

Still referring to FIGS. 4-7, the outer surface 182 of the flange portion 176 of the control valve seat 160 is curved along outboard portions 198*a*, 198*b* of the first and second wings 196*a*, 196*b*. The outer surface 182 of the flange portion 176 of the control valve seat 160 also has an inboard portion 200 that is planar and not curved to provide a larger cross-sectional thickness T along the inboard portion 200 than along the outboard portions 198*a*, 198*b* of the first and second wings 196*a*, 196*b*. The inboard portion 200 of the outer surface 182 includes and extends across the land 184, an annular shoulder 202 that is positioned outboard of and that extends circumferentially about the annular rib 188, and saddle portions 204*a*, 204*b* of the first and second wings 196*a*, 196*b*.

The saddle portions 204*a*, 204*b* are positioned adjacent to the cut-outs 192*a*, 192*b* in the flange portion 176 of the control valve seat 160 and are delineated by transition lines 206. In the illustrated example, the transition lines 206 generally run parallel to one another one on each side of the cut-outs 192*a*, 192*b* and generally run tangentially with respect to the annular rib 188. By way of example and without limitation, the control valve seat 160 may be made of powdered metal. Powdered metal is particularly suitable for creating the complex geometry of the control valve seat 160, while at the same time providing sufficient strength in compression to withstand the forces placed on the control valve seat 160 when the external control valve 162 is installed on the damper 32.

Each of the first and second wings 196*a*, 196*b* has an outside edge 208 that is curved along a first radius R1 that is measured relative to the centerline CL. The annular shoulder 202 is curved along a second radius R2 that is measured relative to the centerline CL and is smaller than the first radius R1.

The first and second windows 194*a*, 194*b* in the flange portion 176 of the control valve seat 160 permit hydraulic fluid discharged from the control valve outlet 168 to flow through the reserve tube opening 158 and into the reservoir chamber 150. Each of the cut-outs 192*a*, 192*b*, which define the first and second windows 194*a*, 194*b*, has an inboard edge 210 that is convex and curved along a third radius R3 that is measured relative to the centerline CL and is smaller than the first radius R1. Each of the cut-outs 192*a*, 192*b* also has a corner radius CR to each side of the inboard edge 210 that is concave and is smaller than the third radius R3 and a nose radius NR to each side of each corner radius CR that is convex and is smaller than the corner radius CR.

Operation of the damper 32 during a compression stroke and an extension (e.g., rebound) stroke will now be explained in greater detail.

Figure 8:
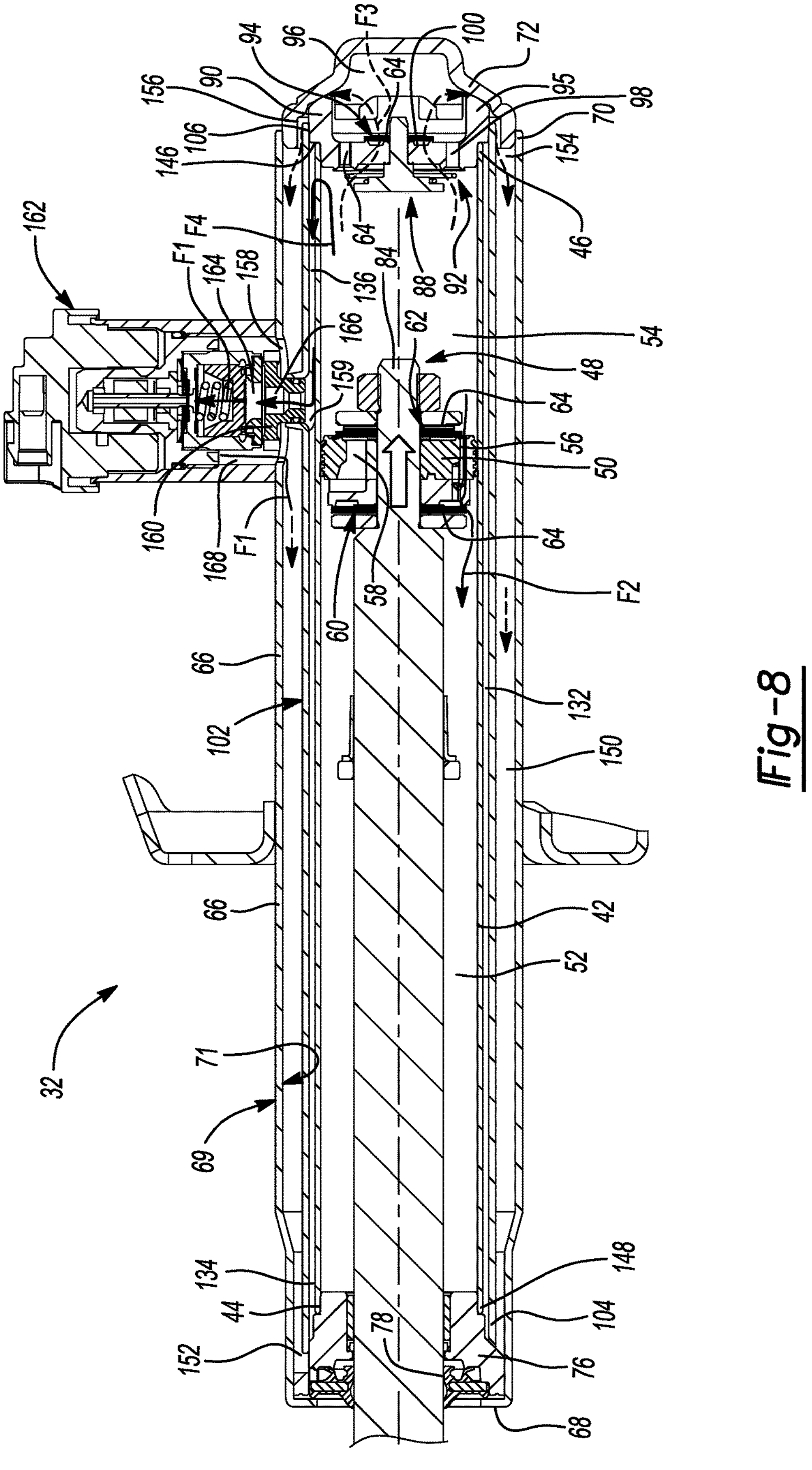
FIG. 8 is a side cross-sectional view of the damper shown in FIG. 3A, where arrows are included illustrating the fluid flow path through the damper during a compression stroke.

With reference to FIG. 8, the damper 32 is shown in the compression stroke. A compression flow path F1 is defined when the external control valve 162 is opened. The piston 50 moves toward the second pressure tube end 46 where fluid in the second working chamber 54 flows through the first piston valve 60 of the piston assembly 48 to the first working chamber 52 along flow path F2. Additionally, fluid in the second working chamber 54 flows through the second base valve 94 of the base valve assembly 88 and through the reservoir chamber passages 156 to the reservoir chamber 150 along flow path F3. Fluid in the second working chamber 54 also flows to the intermediate chamber 132 via the intermediate chamber opening(s) 146 in the second intermediate tube end 106 and/or the base valve body 90 along flow path F4. Fluid in the intermediate chamber 132 flows to the control valve inlet 164 through the control valve inlet passage 166 in the control valve seat 160. Finally, fluid from the control valve inlet 164 flows to the control valve outlet 168 and into the reservoir chamber 150 via the windows 194*a*, 194*b* in the flange portion 176 of the control valve seat 160 and the reserve tube opening 158 along the compression flow path F1.

Figure 9:
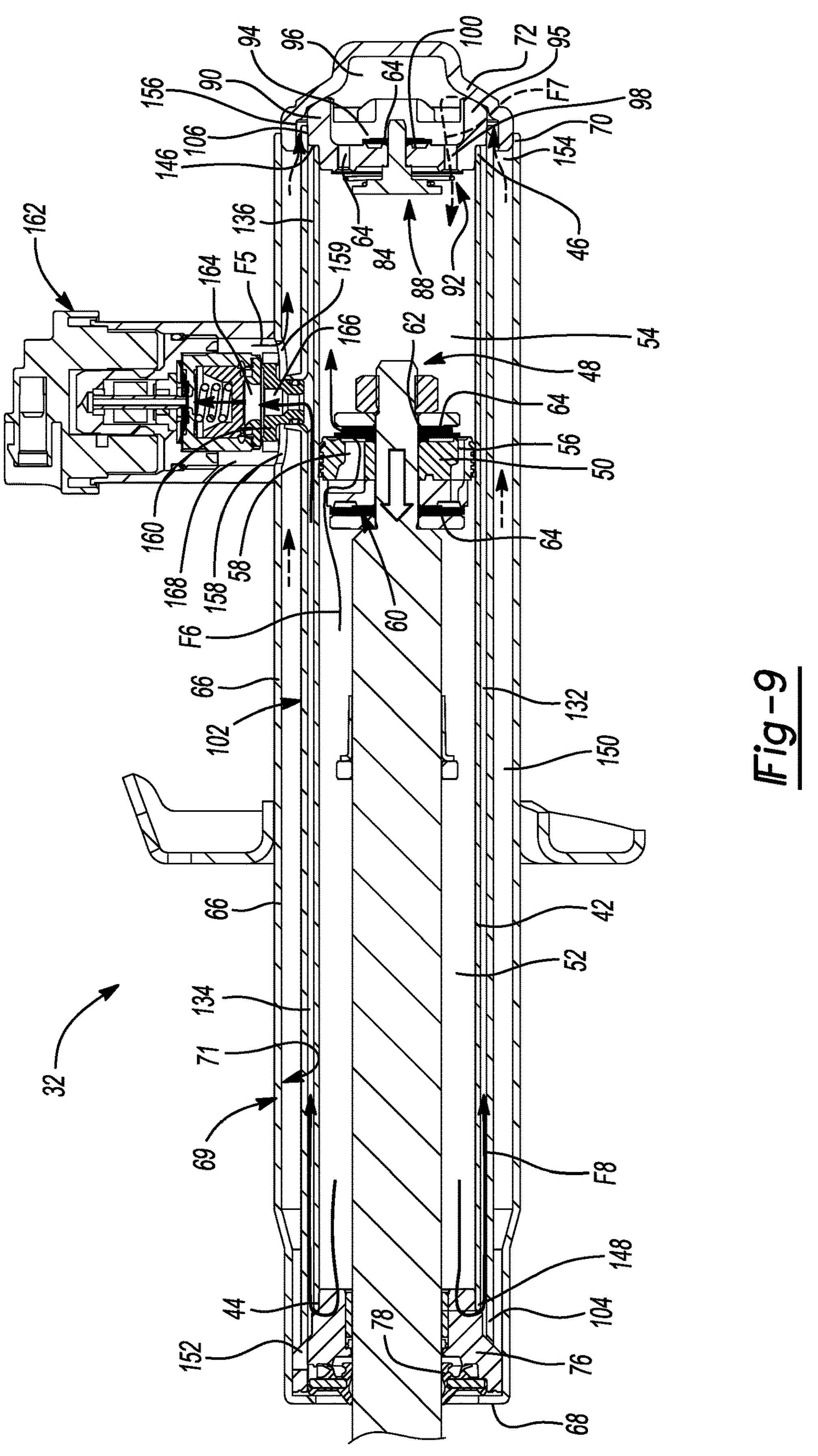
FIG. 9 is another side cross-sectional view of the damper shown in FIG. 3A, where arrows are included illustrating the fluid flow path through the damper during an extension/rebound stroke.

With reference to FIG. 9, the damper 32 is shown in an extension/rebound stroke. An extension flow path F5 is defined when the external control valve 162 is opened. The piston 50 moves toward the first pressure tube end 44 where fluid in the first working chamber 52 flows through the second piston valve 62 of the piston assembly 48 to the second working chamber 54 along flow path F6. Fluid in the reservoir chamber 150 flows through the reservoir chamber passages 156 and through the first base valve 92 of the base valve assembly 88 to the second working chamber 54 along flow path F7. Fluid in the first working chamber 52 flows to the intermediate chamber 132 via the pressure tube opening(s) 148 in the first pressure tube end 44 and/or the piston rod guide 76 along flow path F8. Fluid in the intermediate chamber 132 flows to the control valve inlet 164 via the control valve inlet passage 166 in the control valve seat 160. Finally, fluid from the control valve inlet 164 flows to the control valve outlet 168 and into the reservoir chamber 150 via the windows 194*a*, 194*b* in the flange portion 176 of the control valve seat 160 and the reserve tube opening 158 along the extension flow path F5.

While aspects of the present disclosure have been particularly shown and described with reference to the embodiments above, it will be understood by those skilled in the art that various additional embodiments may be contemplated by the modification of the disclosed dampers without departing from the spirit and scope of what is disclosed. Such embodiments should be understood to fall within the scope of the present disclosure as determined based upon the claims and any equivalents thereof.

What is claimed is:

1. A damper, comprising:

a pressure tube;

a piston slidably disposed within said pressure tube defining a first working chamber and a second working chamber within said pressure tube;

a reserve tube disposed annularly around said pressure tube;

an intermediate tube disposed annularly about said pressure tube and positioned radially between said pressure tube and said reserve tube;

a reservoir chamber disposed radially between said intermediate tube and said reserve tube;

an intermediate chamber disposed radially between said intermediate tube and said pressure tube;

a reserve tube opening that extends through said reserve tube;

an intermediate tube opening that extends through said intermediate tube;

an external control valve including a control valve inlet positioned in fluid communication with said intermediate chamber and a control valve outlet positioned in fluid communication with said reservoir chamber;

a control valve seat including a valve seat body with a neck portion that is at least partially received within said reserve tube opening and a flange portion that extends out from said neck portion of said valve seat body;

said control valve seat including a control valve inlet passage that extends through said valve seat body from said intermediate tube opening to said control valve inlet; and said flange portion of said control valve seat including a pair of cut-outs that are circumferentially spaced from one another to define first and second windows that are open to and arranged in fluid communication with said reservoir chamber and first and second wings that extend out from said neck portion and sit against said reserve tube.

2. The damper as set forth in claim 1, wherein said flange portion of said control valve seat includes an outer surface with a land that is arranged in abutment with said external control valve and a curved inner surface that abuts an outside surface of said reserve tube and wherein said curved inner surface of said flange portion of said control valve seat has a load bearing surface area that is increased in size by said first and second wings to reduce deformation of said reserve tube when said external control valve is installed and pressed against said control valve seat.

3. The damper as set forth in claim 2, wherein said first and second wings extend circumferentially relative to said neck portion of said control valve seat along a limited circumferential extent between said first and second windows.

4. The damper as set forth in claim 3, wherein said first and second windows defined by said cut-outs in said flange portion of said control valve seat permit hydraulic fluid discharged from said control valve outlet to flow through said reserve tube opening in said reserve tube and into said reservoir chamber.

5. The damper as set forth in claim 2, wherein said outer surface of said flange portion of said control valve seat is curved along outboard portions of said first and second wings.

6. The damper as set forth in claim 5, wherein said outer surface of said flange portion of said control valve seat has an inboard portion that is planar and not curved to provide a larger cross-sectional thickness along said inboard portion than along said outboard portions of said first and second wings.

7. The damper as set forth in claim 6, wherein said inboard portion of said outer surface of said flange portion of said control valve seat including and extending across said land, an annular shoulder outboard of said annular rib, and saddle portions of said first and second wings that are positioned adjacent to said cut-outs in said flange portion.

8. The damper as set forth in claim 7, wherein said land on said outer surface of said flange portion of said control valve seat includes an annular rib that abuts said external control valve and extends annularly about said control valve inlet when said external control valve is installed and pressed against said control valve seat and wherein said saddle portions and said outboard portions of said first and second wings are delineated by transition lines that run parallel to one another one on each side of said cut-outs and tangentially with respect to said annular rib.

9. The damper as set forth in claim 2, wherein said control valve seat includes a fillet where said curved inner surface of said flange portion of said control valve seat meets said neck portion of said valve seat body.

10. The damper as set forth in claim 1, wherein each of said first and second wings has an outside edge that is curved along a first radius that is measured relative to a centerline that extends coaxially with said control valve inlet passage in said control valve seat.

11. The damper as set forth in claim 10, wherein said flange portion of said control valve seat includes an outer surface with an annular shoulder that is curved along a second radius that is measured relative to said centerline and is smaller than said first radius.

12. The damper as set forth in claim 10, wherein each of said cut-outs has an inboard edge that is convex and curved along a third radius that is measured relative to said centerline and is smaller than said first radius.

13. The damper as set forth in claim 12, wherein each of said cut-outs has a corner radius to each side of said inboard edge that is concave and is smaller than said third radius.

14. The damper as set forth in claim 13, wherein each of said cut-outs has a nose radius to each side of said corner radius that is convex and is smaller than said corner radius.

15. The damper as set forth in claim 1, further comprising:

a base valve assembly positioned between said second pressure tube end and said second reserve tube end, said base valve assembly including a base valve body, a first base valve, and a second base valve;

an end chamber positioned between said second reserve tube end and said base valve body; and at least one reservoir chamber passage that is arranged in fluid communication with and extends between said reservoir chamber and said end chamber.

16. A damper, comprising:

a pressure tube extending longitudinally between a first pressure tube end and a second pressure tube end;

a piston slidably disposed within said pressure tube defining a first working chamber between said piston and said first pressure tube end and a second working chamber within said pressure tube between said piston and said second pressure tube end;

a reserve tube disposed annularly around said pressure tube, said reserve tube including an outside surface and an inside surface and extending longitudinally between a first reserve tube end and a second reserve tube end;

an intermediate tube disposed annularly about said pressure tube and positioned radially between said pressure tube and said reserve tube, said intermediate tube extending longitudinally between a first intermediate tube end and a second intermediate tube end;

a reservoir chamber disposed radially between said intermediate tube and said reserve tube;

an intermediate chamber disposed radially between said intermediate tube and said pressure tube;

a reserve tube opening that extends through said reserve tube;

an intermediate tube opening that extends through said intermediate tube;

an external control valve including a control valve inlet positioned in fluid communication with said intermediate chamber and a control valve outlet positioned in fluid communication with said reservoir chamber;

a control valve seat including a valve seat body with a neck portion that is at least partially received within said reserve tube opening and a flange portion that extends out from said neck portion of said valve seat body;

said control valve seat including a control valve inlet passage that extends through said valve seat body from said intermediate tube opening to said control valve inlet;

said flange portion of said control valve seat including an outer surface with a land that is arranged in abutment with said external control valve and a curved inner surface that sits flush against said outside surface of said reserve tube; and said flange portion of said control valve seat including a pair of cut-outs that are circumferentially spaced from one another to define first and second windows that are open to and arranged in fluid communication with said reserve tube opening and first and second wings that extend circumferentially relative to said neck portion along a limited circumferential extent between said first and second windows.

17. The damper as set forth in claim 15, further comprising:

a piston rod guide positioned at said first pressure tube end, said first intermediate tube end, and said first reserve tube end;

a base valve assembly positioned at said second pressure tube end, said second intermediate tube end, and said second reserve tube end, said base valve assembly including a base valve body defining an end chamber arranged in fluid communication with said second working chamber via at least one base valve; and at least one reservoir chamber passage positioned in fluid communication with and extending between said reservoir chamber and said end chamber.

18. A damper, comprising:

a pressure tube extending longitudinally between a first pressure tube end and a second pressure tube end;

a piston slidably disposed within said pressure tube defining a first working chamber and a second working chamber within said pressure tube;

a reserve tube disposed annularly around said pressure tube;

an intermediate tube disposed annularly about said pressure tube and positioned radially between said pressure tube and said reserve tube;

a reservoir chamber disposed radially between said intermediate tube and said reserve tube;

an intermediate chamber disposed radially between said intermediate tube and said pressure tube;

a reserve tube opening that extends through said reserve tube;

an intermediate tube opening that extends through said intermediate tube;

a base valve assembly including a base valve body defining an end chamber arranged in fluid communication with said second working chamber via at least one base valve;

at least one reservoir chamber passage positioned in fluid communication with and extending between said reservoir chamber and said end chamber;

an external control valve including a control valve inlet positioned in fluid communication with said intermediate chamber and a control valve outlet positioned in fluid communication with said reservoir chamber;

a control valve seat including a valve seat body with a neck portion that is at least partially received within said reserve tube opening and a flange portion that extends out from said neck portion of said valve seat body;

said control valve seat including a control valve inlet passage that extends through said valve seat body from said intermediate tube opening to said control valve inlet; and said flange portion of said control valve seat including a pair of cut-outs that are circumferentially spaced from one another to define first and second windows that are open to and arranged in fluid communication with said reservoir chamber and first and second wings that extend out from said neck portion and sit against said reserve tube.

19. The damper as set forth in claim 18, wherein a compression flow path is defined when said external control valve is opened and said piston moves toward said second pressure tube end where fluid in said second working chamber flows through said base valve to said reservoir chamber and fluid in said intermediate chamber flows through said control valve inlet passage in said control valve seat and to said control valve inlet and fluid flows from said control valve outlet to said reservoir chamber through said windows in said flange portion of said control valve seat and through said reservoir tube opening.

20. The damper as set forth in claim 18, wherein an extension flow path is defined when said external control valve is opened and said piston moves toward said first pressure tube end where fluid in said reservoir chamber flows through said base valve to said second working chamber and fluid in said intermediate chamber flows through said control valve inlet passage in said control valve seat and to said control valve inlet and fluid flows from said control valve outlet to said reservoir chamber through said windows in said flange portion of said control valve seat and through said reservoir tube opening.

* * * * *